(12) United States Patent
Sugaya et al.

(10) Patent No.: US 6,569,301 B2
(45) Date of Patent: May 27, 2003

(54) CATION EXCHANGE MEMBRANE SELECTIVELY PERMEABLE TO MONOVALENT CATIONS AND METHOD FOR ITS PRODUCTION

(75) Inventors: Yoshio Sugaya, Yokohama (JP); Motoo Fukui, Yokohama (JP); Yoshiharu Aoki, Ichihara (JP)

(73) Assignee: Asahi Glass Company, Limited, Tokyo (JP)

( * ) Notice: Subject to any disclaimer, the term of this patent is extended or adjusted under 35 U.S.C. 154(b) by 84 days.

(21) Appl. No.: 09/964,518

(22) Filed: Sep. 28, 2001

(65) Prior Publication Data

US 2002/0053511 A1 May 9, 2002

Related U.S. Application Data

(63) Continuation of application No. PCT/JP01/00537, filed on Jan. 26, 2001.

(30) Foreign Application Priority Data

Jan. 28, 2000 (JP) ......................................... 2000-019978

(51) Int. Cl.[7] ................................................. C25B 13/00
(52) U.S. Cl. ....................... 204/296; 204/627; 204/630; 204/518; 204/520; 204/521; 204/523; 204/529; 521/27; 205/618
(58) Field of Search ................................. 204/296, 627, 204/630, 523, 518, 520, 521, 529; 521/27; 205/618

(56) References Cited

U.S. PATENT DOCUMENTS

| | | | | |
|---|---|---|---|---|
| 3,784,457 A | * | 1/1974 | Mizutani et al. | 204/627 |
| 3,847,772 A | * | 11/1974 | Sata et al. | 204/627 |
| 4,189,361 A | * | 2/1980 | Seita et al. | 204/296 |
| 4,332,665 A | * | 6/1982 | Kimoto et al. | 204/296 |
| 4,382,123 A | * | 5/1983 | Kimoto et al. | 521/27 |
| 4,871,461 A | * | 10/1989 | Karakane et al. | 210/638 |
| 6,180,754 B1 | * | 1/2001 | Stutts et al. | 528/422 |

FOREIGN PATENT DOCUMENTS

| | | |
|---|---|---|
| JP | 50-160185 | 12/1975 |
| JP | 55-8838 | 1/1980 |
| JP | 4-90828 | 3/1992 |
| JP | 5-293345 | 11/1993 |
| JP | 9-48861 | 2/1997 |

* cited by examiner

Primary Examiner—Bruce F. Bell
(74) Attorney, Agent, or Firm—Oblon, Spivak, McClelland, Maier & Neustadt, P.C.

(57) ABSTRACT

The present invention provides a cation exchange membrane which has excellent durability, a high limiting current density, a low direct current membrane resistance and excellent selectivity to monovalent cations. In the present invention, a cation exchange membrane excellent in selective permeability to monovalent cations is produced by bringing high molecular cations into contact with a surface of a cation exchange membrane in the presence of anions of an oxyacid or anions of an organic sulfonic acid.

18 Claims, No Drawings

CATION EXCHANGE MEMBRANE SELECTIVELY PERMEABLE TO MONOVALENT CATIONS AND METHOD FOR ITS PRODUCTION

This application is a Continuation of prior International PCT Application No. PCT/JP01/00537 filed Jan. 26, 2001.

TECHNICAL FIELD

The present invention relates to a cation exchange membrane which is useful for concentration or separation of an aqueous electrolyte solution or for production of demineralized water employing an ion exchange membrane, and a method for its production. More particularly, it relates to a cation exchange membrane selectively permeable to monovalent cations, which permits cations having small electric charges to readily permeate particularly selectively, and which is useful for concentration or separation of an aqueous electrolyte solution or production of demineralized water, by electrodialysis, and a method for its production.

BACKGROUND ART

Concentration or separation of an aqueous electrolyte solution, or production of demineralized water, employing an ion exchange membrane, is carried out in various fields. Especially in Japan, in order to establish a salt production technique of concentrating seawater by electrodialysis, many membranes selectively permeable to monovalent ions, which are capable of selectively concentrating sodium chloride from various seawater components, have been proposed and are being practically used. Further, their applications to areas other than concentration of seawater, have also been attempted.

The following methods may be mentioned as conventional methods for imparting selective permeability to monovalent cations, to cation exchange membranes.

(1) A method of making the surface portion of a cation exchange membrane to have a dense structure (for example, making the surface layer to be a layer having a high cross-linking degree or a layer having a high fixed ion concentration);

(2) A method of forming an electrically neutral thin layer containing no ion exchange groups, on the surface of a cation exchange membrane;

(3) A method of forming a thin layer having an opposite electrical charge, on the surface of a cation exchange membrane.

(4) A method of employing two or more of the above methods (1) to (3) in combination.

Among the above methods, method (1) is usually excellent in durability, but has a drawback that the electrical resistance is high, and method (2) is inadequate in selective permeability. Whereas, method (3) usually has a merit in that selectivity to monovalent ions is excellent, and the electrical resistance is low, but the initially proposed method (JP-704599) had drawbacks that the molecular weight of the material forming the opposite electric charge layer was low, the durability of the selectivity to monovalent cations was inadequate, and if the opposite electrical charge layer was made to increase the durability or the selectivity, an increase in the direct current resistance or a decrease in the limiting current density was likely to be led.

Many proposals have been made to overcome such drawbacks, and one of such proposals is a method of forming a selective layer by an opposite electrical charge compound having the solubility controlled, such as a non-crosslinkable substance having anion exchange groups and having a specific HLB value and molecular weight (JP-A-55-8838) or a polymer having anion exchange groups and having a specific solubility to seawater (JP-A-9-48861). By such a method, the durability under application of electric current can be improved, but there is a problem that in a state where application of electric current has been stopped, the selective layer tends to gradually elute from the membrane, whereby the selectivity tends to deteriorate.

Further, as a method to prevent such a drawback, a method of treating a cation exchange membrane immersed in a mixture of an organic solvent and water, with the opposite electrical charge compound (JP-B-6-49786), or a method of treating it with a high molecular amine in an electrically non-charged state (JP-A-4-90828) for the purpose of improving the durability by permitting the opposite electrical charge layer to penetrate into the membrane, but such a method has not necessarily been adequate.

Further, there is a method in which a compound having an opposite electrical charge or convertible to have an opposite electrical charge, is polymerized on the surface of a cation exchange membrane to form an insolubilized layer (JP-A-62-205135, etc.). By this method, the durability of the selectivity to monovalent cations can be improved to a large extent, but there is a problem such that the direct current resistance of the membrane is likely to be high at the time of concentration of seawater, while the alternate current resistance of the membrane is low.

DISCLOSURE OF THE INVENTION

The present invention has been made to solve the above problems, and the cation exchange membrane selectively permeable to monovalent cations of the present invention, is characterized by having, on at least one side of the cation exchange membrane, a surface treated by contact with high molecular cations in the presence of anions of an oxyacid or ions of an organic sulfonic acid.

Further, the method for producing a cation exchange membrane selectively permeable to monovalent cations of the present invention, is characterized by contacting at least one surface of a cation exchange membrane with high molecular cations in the presence of anions of an oxyacid and ions of an organic sulfonic acid (hereinafter, these acids may sometimes be referred to as an oxyacid, etc., and their ions may sometimes be referred to as oxyacid anions, etc.).

In the present invention, as described above, at least one surface of the cation exchange membrane is brought in contact with high molecular cations in the presence of anions of an oxyacid or ions of an organic sulfonic acid. However, the reason why such a contact is effective, has not yet been clarified, but the effects are evident from Examples given hereinafter.

BEST MODE FOR CARRYING OUT THE INVENTION

The cation exchange membrane selectively permeable to monovalent cations of the present invention is one having, on at least one side of the cation exchange membrane, a surface treated by contact with high molecular cations in the presence of anions of an oxyacid or ions of an organic sulfonic acid, as mentioned above. As cation exchange membranes prior to the treatment to impart the selective permeability to monovalent cations, the following membranes may, for example, be mentioned, and they can be used without any particular restriction.

(1) A cation exchange membrane obtained by impregnating a reinforcing cloth with styrene/divinyl benzene, followed by polymerization and then by sulfonization.

(2) A heterogeneous cation exchange membrane formed in a membrane-shape from a kneaded blend of a cation exchange resin powder and a binder.

(3) A cation exchange membrane obtained by graft-polymerizing a monomer convertible to a cation exchange group or having a cation exchange group to a polyolefin or fluorine type film.

(4) A perfluoro type cation exchange membrane useful as a sodium chloride electrolytic membrane for an ion exchange membrane method.

To prepare the cation exchange membrane selectively permeable to monovalent cations of the present invention, at least one side of a cation exchange membrane as listed above, is contacted with high molecular cations in the presence of anions of an oxyacid or ions of an organic sulfonic acid. The high molecular cations in the present invention are defined to be a high molecular electrolyte, of which the average molecular weight (the average formula weight) of cations charged positively during the use of the cation exchange membrane, is at least 5,000. As the high molecular electrolyte which gives such high molecular cations, a water-soluble polymer may, for example, be mentioned, such as polyethyleneimine, polyallylamine, a polyamizine, a hexamethylenediamine/epichlorohydrin polycondensate, a dicyandiamide/formalin polycondensate, a guanidine/formalin polycondensate, a polyvinyl benzyl trimethylammonium chloride, a poly(4-vinyl pyridine), a poly(2-vinyl pyridine), a poly(dimethylaminoethyl acrylate), a poly(dimethylaminoethyl methacrylate), a poly (1-vinyl imidazole), a poly(2-vinyl pyrazine), a poly(4-butenyl pyridine), a poly(N,N-dimethylacrylamide), a poly (N,N-dimethylaminopropylacrylamide), or a salt thereof.

Among them, a homopolymer or copolymer of allylamine having a molecular weight of at least 5,000, is particularly preferred. Specifically, a polyallylamine having a molecular weight of at least 5,000, preferably at least 10,000, particularly preferably at least 50,000, as a homopolymer of allylamine, or a copolymer of allylamine with other monomer, such as a copolymer of allylamine with diallylamine, is particularly preferred, in that it provides a remarkable effect for imparting selective permeability to monovalent cations by the treatment by contact with the cation exchange membrane in the presence of anions of an oxyacid according to the present invention.

Now, the anions to be present together with the above-described high molecular cations in the present invention, will be described. As mentioned above, they include anions of an oxyacid and ions of an organic sulfonic acid. The anions of an oxyacid as the former, are anions which will be formed when an oxyacid having oxygen coordinated to a metal or non-metal other than oxygen, or its salt, is dissolved in water.

The compound which forms such anions of an oxyacid, may, for example, be nitric acid, nitrous acid, sulfuric acid, sulfurous acid, pyrosulfuric acid, carbonic acid phosphoric acid, silicic acid, chloric acid, chromic acid, antimonic acid, manganic acid, or a salt thereof. Among them, nitric acid, nitrous acid, sulfuric acid, sulfurous acid, pyrosulfuric acid, carbonic acid phosphoric acid, silicic acid, or a salt thereof, is further preferred. The salt of such an acid may, for example, be a salt of an alkali metal or an alkaline earth metal.

Further, the latter ions of an organic sulfonic acid are anions which will be formed when a sulfonic acid having a sulfonic group bonded to an aromatic ring such as a benzene ring, to an alkylene group directly bonded to an aromatic ring or to a carbon atom of an aliphatic hydrocarbon, or its salt, is dissolved in water. The compound which forms such anions may, for example, be a polystyrene sulfonic acid or its salt, a polyvinyl benzyl sulfonic acid or its salt, or a polyvinyl sulfonic acid or its salt.

The above-mentioned high molecular electrolyte which forms high molecular cations, is contacted to one side or both sides of a cation exchange membrane in the presence of such a compound which forms anions of an oxyacid. It is preferred from the viewpoint of development of selective permeability to monovalent cations and its durability that the anions of an oxyacid are present in an amount of at least 0.5 chemical equivalent to the high molecular cations. Further, anions other than the anions of an oxyacid, such as chlorine ions, may also be present without any particular problem.

The method for the treatment is not particularly limited, and various methods are available, such as a method wherein a solution obtained by preliminarily mixing a high molecular electrolyte solution and a solution of an oxyacid or the like, or a salt thereof, is coated or impregnated on at least one side of a cation exchange membrane, and a method wherein either one of the solutions is coated or impregnated to a cation exchange membrane and then the other solution is coated or impregnated, to let both be present on the cation exchange membrane.

With respect to the solution of a high molecular weight electrolyte to be coated or impregnated to the cation exchange membrane, the concentration varies depending upon the time or temperature for the contact. However, it is contacted usually at a concentration of from 0.01 to 200,000 ppm, preferably from 0.2 to 5,000 ppm at a temperature of from 0 to 150° C., preferably from 20 to 120° C.

Thus, the selectivity to monovalent cations will be imparted by the contact in the presence of the anions of an oxyacid and high molecular weight cations. After such treatment, post treatment may further be carried out such as heat treatment or a reaction with formalin, epichlorohydrin or an alkylene dihalide utilizing reaction sites in the high molecular cations, such as active hydrogen bonded to a nitrogen atom, for insolubilization.

In the following, the present invention will be described in further detail with reference to Examples. However, it should be understood that the present invention is by no means restricted to such specific Examples, and it should be understood as defined by the description in the claims.

Before describing the Examples, the evaluation method for the cation exchange membrane selectively permeable to monovalent cations will firstly be explained. For this evaluation, a four compartment type batch system electrodialytic cell comprising an anode compartment, a dilution compartment, a concentration compartment and a cathode compartment, having an effective current-carrying area of 4×2.5 cm$^2$, defined by disposing, from the side of an anode employing a silver/silver chloride electrode, an anion exchange membrane selectively permeable to monovalent anions, a cation exchange membrane as an Example of the present invention, and an anion exchange membrane selectively permeable to monovalent anions, was formed, and such a cell was used.

To the anode compartment, the concentration compartment and the cathode compartment of such an electrodialytic cell, 1 mol/l of a NaCl solution was supplied, and to the dilution compartment, a solution containing 0.45 mol/l of chloride ions, 0.025 mol/l of sulfuric acid ions, 0.37 mol/l of sodium ions, 0.01 mol/l of potassium ions, 0.05 mol/l of magnesium ions and 0.01 mol/l of calcium ions, was filled, whereupon electrodialysis was carried out at 25° C. at a current density of 2 A/dm$^2$, whereupon from the amounts of magnesium ions, calcium ions and chloride ions concentrated in the concentration compartment, a simplified salt purity ratio was obtained by the following formula.

Here, the simplified salt purity ratio is a numerical value representing the performance for selectively concentrating NaCl from seawater, and the higher the simplified salt purity ratio, the higher the selectivity. In the following formula, (−2.5) at the end represents the proportion of K ions in the seawater ions empirically obtained. In this simplified salt purity ratio, the concentration of K ions is not measured, and the content of K ions is corrected by subtracting the above empirical value.

Simplified salt purity ratio (%)=100×(([Cl]−[Mg]−[Ca])/[Cl])−2.5

And, the cation exchange membrane of the Example and SELEMION ASV as an anion exchange membrane manufactured by Asahi Glass Company, Limited, were set in an electrodialyzer 0 (zero) model (effective area: 2.1 dm$^2$), manufactured by Asahi Glass Company, Limited, and a concentration test was also carried out wherein real seawater was supplied to the dilution compartment at a flow rate of 7 cm/sec at a temperature of 25° C. Except for the cation exchange membrane, the unit cell voltage was obtained under the same conditions. Further, the current density was varied, and the voltage was measured, whereby the current density at which the direct resistance increased, was obtained as the limiting current density.

EXAMPLE 1

One side of SELEMION CMV as a cation exchange membrane, manufactured by Asahi Glass Company, Limited, was immersed for 60 minutes in a 0.25 mol/l sodium sulfate solution containing 100 ppm of polyallylamine hydrochloride having a molecular weight of 10,000 (PAA-HCL-3L, manufactured by Nitto Boseki Co., Ltd.), and then washed with water. The above cation exchange membrane after washing with water, was set in the four compartment batch system electrodialytic cell so that the treated surface would be on the dilution compartment side, whereupon the simplified salt purity ratio was obtained.

Then, to evaluate the durability of the surface layer of the cation exchange membrane having the selectivity treatment applied, the membrane was taken out from the electrodialytic cell and immersed in 0.5 mol/l NaCl solution at 60° C., and upon expiration of one day and 30 days after the immersion treatment (the 0.5 mol/l NaCl solution was replaced afresh five times a week), it was again set in the electrodialytic cell, and the simplified salt purity ratio was measured. The results are shown in Table 1.

EXAMPLE 2

The simplified salt purity ratio was measured in the same manner as in Example 1 except that instead of the polyallylamine hydrochloride having a molecular weight of 10,000 in Example 1, polyallylamine hydrochloride having a molecular weight of 100,000 (PAA-HCL-10L, manufactured by Nitto Boseki Co., Ltd.) was used, and the results are shown in Table 1.

EXAMPLE 3

The simplified salt purity ratio was measured in the same manner as in Example 1 except that instead of the polyallylamine hydrochloride in Example 1, polyallylamine of free type (molecular weight 10,000) was used, and the pH of the treating solution was changed to 12. The result was 70%. Further, the membrane was immersed in 0.25 mol/l sulfuric acid for 16 hours and then, the simplified salt purity ratio was measured again and was found to have increased to 96%.

Comparative Examples 1 and 2

The simplified salt purity ratio was measured in the same manner as in Example 2 except that instead of the sodium sulfate solution in Example 2, pure water was used in Comparative Example 1, and a sodium chloride solution was used in Comparative Example 2, and the results are shown in Table 1.

TABLE 1

| | High molecular electrolyte | Co-existent electrolyte | pH of treated solution | Initial salt purity ratio (1 day) | Salt purity ratio after immersion | |
|---|---|---|---|---|---|---|
| | | | | | 1 day | 30 days |
| Ex. 1 | Polyallylamine hydrochloride having a molecular weight of 10,000 | Na$_2$SO$_4$ | 6.9 | 7 | 95 | 81 |
| Ex. 2 | Polyallylamine hydrochloride having a molecular weight of 100,000 | Na$_2$SO$_4$ | 6.9 | 8 | 96 | 95 |
| Comp. Ex. 1 | Polyallylamine hydrochloride having a molecular weight of 100,000 | Nil (pure water) | 6.9 | 2 | — | — |
| Comp. Ex. 2 | Same as above | NaCl | 6.8 | 8 | 75 | 69 |

From the results in Table 1, it is evident that the co-existence of SO$_4$ ions is effective for the development of the selective permeability to monovalent cations. Further, it is evident that the higher the molecular weight of the high molecular cations, the better the durability.

EXAMPLES 4 TO 7

The simplified salt purity ratio was measured in the same manner as in Example 2 except that instead of sodium sulfate in Example 2, a sodium nitrate solution was used in Example 4, a sodium hydrogen carbonate solution was used in Example 5, a monosodium dihydrogen phosphate solution was used in Example 6, and a sodium polystyrene sulfonate solution of 0.005 mol/l as calculated as sulfonic acid groups, was used in Example 7, and the results are shown in Table 2.

Comparative Examples 3 and 4

The simplified salt purity ratio was measured in the same manner as in the corresponding Examples except that in Comparative Example 3, sodium carbonate was used instead of sodium hydrogen carbonate in Example 4, and in Comparative Example 4, sodium phosphate was used instead of monosodium dihydrogen phosphate in Example 5, and the results are shown in Table 2.

TABLE 2

| | Co-existent electrolyte | pH of treated solution | Initial salt purity ratio |
|---|---|---|---|
| Ex. 4 | NaNO$_3$ | 6.8 | 96 |
| Ex. 5 | NaHCO$_3$ | 8.3 | 95 |
| Ex. 6 | NaH$_2$PO$_4$ | 4.2 | 94 |
| Ex. 7 | sodium polystyrene sulfonate | 7.5 | 95 |
| Comp. Ex. 3 | Na$_2$CO$_3$ | 11.4 | 78 |
| Comp. Ex. 4 | Na$_3$PO$_4$ | 12.3 | 68 |

From the results in Table 2, it is evident that in a state where the pH was low, and the high molecular cations were dissociated, the selectivity was developed by the co-existence of anions of an oxyacid such as $NO_3$ anions, $HCO_3$ anions or $H_2PO_4$ anions, or anions of polystyrene sulfonic acid.

EXAMPLES 8 TO 11

By changing the sodium sulfate concentration in Example 2, a plurality of mixed solutions differing in the chemical equivalent ratio of sulfuric acid ions to the amino groups of polyallylamine, were formed, and cation exchange membranes were treated by the respective mixed solutions, and the simplified salt purity ratio was measured, and the results are shown in Table 3. From the results, it is evident that the selectivity was developed when the equivalent ratio of $SO_4^{2-}$ ions as the co-existent ions to the amino groups of polyallylamine, was at least 0.5.

TABLE 3

|  | Equivalent ratio of $SO_4$/amino groups | Initial salt purity ratio |
| --- | --- | --- |
| Example 8 | 0.5 | 77 |
| Example 9 | 1.0 | 92 |
| Example 10 | 2.0 | 95 |
| Example 11 | 5.0 | 96 |

EXAMPLE 12

The simplified salt purity ratio was measured in the same manner as in Example 2 except that instead of the polyallylamine in Example 2, a polyethyleneimine having a molecular weight of 10,000 was used, and instead of 0.25 mol/l $NaSO_4$, 0.018 mol/l of $Na_2SiO_3$ was used, and the results are shown in Table 4.

Comparative Example 5

The simplified salt purity ratio was measured in the same manner as in Example 12 except that a 0.5 mol/l NaCl solution was used instead of 0.018 mol/l $Na_2SiO_3$ in Example 12, and the results are shown in Table 4 together with the results of Example 12.

TABLE 4

|  | Co-existent electrolyte | Initial salt purity ratio | Salt purity ratio upon expiration of 1 day after immersion |
| --- | --- | --- | --- |
| Example 12 | $H_2SiO_3$ | 92 | 87 |
| Comparative Example 5 | NaCl | 92 | 71 |

EXAMPLE 13

A membrane selectively permeable to monovalent cations was prepared under the same conditions as in Example 2, and a seawater concentration test was carried out with an effective area of 2 $dm^2$, whereby the unit cell voltage, the limiting current density and the simplified salt purity ratio after operation of 30 days, were measured. The results are shown in Table 5.

Comparative Examples 6 to 8

To compare the performance with the membrane selectively permeable to monovalent cations prepared in Example 13, a cation exchange membrane having the level of selectivity to monovalent cations varied by treatment with a liquid having a polyethyleneimine having a different concentration dissolved in a 0.5 mol/l NaCl solution, was prepared. The performance test was carried out in the same manner as in Example 13 except that such a membrane was used, whereby the limiting current density (LCD), the unit cell voltage (UCV) and the simplified salt purity ratio after operation for 30 days, were obtained and compared with Example 13. The results are shown in Table 5.

TABLE 5

|  | High molecular electrolyte | Co-existent electrolyte | Initial performance | | | Salt purity ratio upon expiration of 30 days |
| --- | --- | --- | --- | --- | --- | --- |
|  |  |  | Salt purity ratio | UCV | LCD |  |
| Ex. 13 | Polyallylamine hydrochloride | $NaSO_4$ | 96 | 0.3 | 6 | 95.8 |
| Comp. Ex. 6 | Polyallylamine hydrochloride | NaCl | 96 | 0.5 | 1 | 85 |
| Comp. Ex. 7 | Same as above | Same as above | 94 | 0.4 | 2 | 84 |
| Comp. Ex. 8 | Same as above | Same as above | 92 | 0.3 | 3.5 | 83 |

From Table 5 showing the results, it is evident that with the membrane selectively permeable to monovalent cations obtained by the selectivity-imparting treatment of the present invention, the limiting current density is high despite the high salt purity ratio, and the durability is excellent without deterioration of the salt purity ratio even after it was immersed and left to stand in a salt solution for a long period of time.

EXAMPLE 14

One side of SELEMION CMV as a cation exchange membrane manufactured by Asahi Glass Company, Limited, was immersed for 5 minutes in a 0.1 mol/l sodium sulfite solution containing 1,000 ppm of polyallylamine of free type having a molecular weight of 100,000 (PAA-H, manufactured by Nitto Boseki Co., Ltd.), and then subjected to heat treatment by a roll press of 100° C., followed by washing with water. The above cation exchange membrane after washing with water, was set in a four compartment batch system electrodialytic cell so that the treated surface was on the dilution compartment side, and the simplified salt purity ratio was obtained and found to be 96.5%.

Then, to evaluate the durability of the surface layer of the cation exchange membrane having the selectivity treatment applied, the membrane was taken out from the electrodialytic cell, and immersed in deionized water at 60° C. Upon expiration of three weeks, it was again set in the electrodialytic cell, and the simplified salt purity ratio was measured. As a result, it was 95.8% and thus did not substantially decrease.

Comparative Example 9

The simplified salt purity ratio was measured in the same manner as in Example 14 except that in Comparative Example 9, deionized water containing 100 ppm of polyallylamine of free type having a molecular weight of 100,000, was used instead of the sodium sulfite solution of polyallylamine of free type having a molecular weight of 100,000 in Example 14. The result was 94.1%. Further, the membrane was further immersed for 3 weeks in deionized water at 60° C., and then, the simplified salt purity ratio was measured again, and found to have decreased to 89%.

INDUSTRIAL APPLICABILITY

The present invention provides a technique to solve problems involved in the conventional technique of imparting selective permeability to monovalent cations and in the conventional cation exchange membranes selectively permeable to monovalent cations. Particularly, it is an object of the present invention to provide a novel cation exchange membrane selectively permeable to monovalent cations, whereby the durability of the selective permeability to monovalent cations, is secured, and a decrease of the limiting current density or an increase of the direct current resistance due to the selectivity imparted, is suppressed (reduced), and to provide a method for its production.

According to the present invention, selective permeability to monovalent cations is imparted by contacting high molecular cations to at least one side of a cation exchange membrane in the presence of anions of an oxyacid or ions of an organic sulfonic acid, as described above, whereby it is possible to provide a cation exchange membrane having excellent effects i.e. a cation exchange membrane excellent in selectivity to monovalent cations, which has durability, a high limiting current density and a low direct current membrane resistance.

The entire disclosure of Japanese Patent Application No. 2000-19978 filed on Jan. 28, 2000 including specification, claims and summary are incorporated herein by reference in its entirety.

What is claimed is:

1. A cation exchange membrane selectively permeable to monovalent cations, which has, on at least one side of thereof, a surface treated by contact with high molecular cations in the presence of anions of an oxyacid or ions of an organic sulfonic acid.

2. The cation exchange membrane selectively permeable to monovalent cations according to claim 1, wherein the high molecular cations are of a homopolymer or copolymer of allylamine having a molecular weight of at least 5,000.

3. The cation exchange membrane selectively permeable to monovalent cations according to claim 2, wherein the anions of an oxyacid are formed from nitric acid, nitrous acid, sulfuric acid, sulfurous acid, pyrosulfuric acid, carbonic acid, phosphoric acid, silicic acid, or a salt thereof.

4. The cation exchange membrane selectively permeable to monovalent cations according to claim 2, wherein the high molecular cations are of a homopolymer or copolymer of allylamine having a molecular weight of at least 10,000.

5. The cation exchange selectively permeable to monovalent cations according to claim 4, wherein the high molecular cations are of homopolymer of allylamine having a molecular weight of at least 50,000.

6. The cation exchange membrane selectively permeable to monovalent cations according to claim 2, wherein the high molecular cations are of a copolymer of allylamine and diallylamine.

7. The cation exchange membrane selectively permeable to monovalent cations according to claim 1, wherein the anions of an oxyacid are formed from nitric acid, nitrous acid, sulfuric acid, sulfurous acid, pyrosulfuric acid, carbonic acid, phosphoric acid, silicic acid, or a salt thereof.

8. The cation exchange membrane selectively permeable to monovalent cations according to claim 1, wherein said organic sulfonic acid is a polystyrene sulfonic acid or salt thereof, polyvinyl benzyl sulfonic acid or salt thereof or polyvinyl sulfonic acid or salt thereof.

9. A method for selectively concentrating NaCl from sea water, which comprises subjecting sea water to electrodialysis with an electrodialytic cell comprising the cation exchange membrane of claim 1.

10. An electrodialytic cell, comprising the cation exchange membrane of claim 1.

11. The electrodialytic cell of claim 10, which is four compartment batch system electrodialytic cell.

12. A method for producing a cation exchange membrane selectively permeable to monovalent cations, which comprises contacting at least one surface of the cation exchange membrane with high molecular cations in the presence of anions of an oxyacid and ions of an organic sulfonic acid.

13. The method for producing a cation exchange membrane selectively permeable to monovalent cations according to claim 12, wherein the high molecular cations are of a homopolymer or copolymer of allylamine having a molecular weight of at least 5,000.

14. The method for producing a cation exchange membrane selectively permeable to monovalent cations according to claim 13, wherein the anions of an oxyacid are formed from nitric acid, nitrous acid, sulfuric acid, sulfurous acid, pyrosulfuric acid, carbonic acid, phosphoric acid, silicic acid, or a salt thereof.

15. The method for producing a cation-exchange membrane selectively permeable to monovalent cations according to claim 13, wherein the high molecular cations are of a copolymer of allylamine and diallylamine.

16. The method for producing a cation exchange membrane selectively permeable to monovalent cations according to claim 12, wherein the anions of an oxyacid are formed from nitric acid, nitrous acid, sulfuric acid, sulfurous acid, pyrosulfuric acid, carbonic acid, phosphoric acid, silicic acid, or a salt thereof.

17. The method for producing a cation exchange membrane selectively permeable to monovalent cations according to claim 12, wherein the high molecular cations are of a homopolymer or copolymer of allylamine having a molecular weight of at least 10,000.

18. The method for producing a cation exchange membrane selectively permeable to monovalent cations according to claim 17, wherein the high molecular cations are of a homopolymer or copolymer of allylamine having a molecular weight of at least 50,000.

* * * * *

UNITED STATES PATENT AND TRADEMARK OFFICE
CERTIFICATE OF CORRECTION

PATENT NO. : 6,569,301 B2
DATED : May 27, 2003
INVENTOR(S) : Yoshio Sugaya, Motoo Fukui and Yoshiharu Aoki It is certified that error appears in the above-identified patent and that said Letters Patent is hereby corrected as shown below:

<u>Title page,</u>
Item [56], References Cited, U.S. PATENT DOCUMENTS, add
-- 4,042,496 A   8/1977  Tsushima et al   210/23R
   3,647,086 A   3/1972  Mizutani et al   210/22 --
FOREIGN PATENT DOCUMENTS, add
-- JP     05-293345         11/1993 --

Signed and Sealed this

Twenty-third Day of December, 2003

JAMES E. ROGAN
*Director of the United States Patent and Trademark Office*